(12) United States Patent
Tirkkonen et al.

(10) Patent No.: US 7,460,609 B2
(45) Date of Patent: Dec. 2, 2008

(54) TRANSMISSION METHOD USING COMPLEX CHANNEL SYMBOLS

(75) Inventors: Olav Tirkkonen, Helsinki (FI); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 740 days.

(21) Appl. No.: 10/739,017

(22) Filed: Dec. 19, 2003

(65) Prior Publication Data

US 2004/0131041 A1 Jul. 8, 2004

Related U.S. Application Data

(63) Continuation of application No. PCT/FI02/00553, filed on Jun. 24, 2002.

(30) Foreign Application Priority Data

Jun. 25, 2001 (FI) .................................. 20011357

(51) Int. Cl.
  *H04B 7/02* (2006.01)
  *H04L 27/04* (2006.01)
(52) U.S. Cl. ...................................... 375/267; 375/295
(58) Field of Classification Search ................ 375/267, 375/299, 295; 455/101
See application file for complete search history.

(56) References Cited

U.S. PATENT DOCUMENTS

| 6,088,408 | A | 7/2000 | Calderbank et al. | |
| 6,307,851 | B1 * | 10/2001 | Jung et al. | 370/342 |
| 6,922,447 | B1 * | 7/2005 | Ionescu | 375/295 |
| 7,006,848 | B2 * | 2/2006 | Ling et al. | 375/267 |
| 2001/0040928 | A1 * | 11/2001 | Sakoda | 375/260 |

FOREIGN PATENT DOCUMENTS

WO WO 02/43313 A2 5/2002

OTHER PUBLICATIONS

Calderbank, A.R. et al. "Cochannel Interference Suppression Through Time/Space Diversity", IEEE Transactions on Information Theory, vol. 46, No. 3, May 2000.

Hassibi, B. et al. "High-rate Linear Space-Time Codes", Acoustics, Speech and Signal Processing 200 Proceedings, pp. 2461-2464, May 2001.

Tirkkonen, O. et al. "Square-Matrix Embeddable Space-Time Block Codes for Complex Signal Constellations", IEEE Transactions on Information Theory, vol. 48, No. 2, Feb. 2002.

(Continued)

*Primary Examiner*—Khai Tran
(74) *Attorney, Agent, or Firm*—Squire, Sanders & Dempsey L.L.P.

(57) ABSTRACT

A transmission method and a transmitter include one or more antennas for achieving several transmit antenna patterns for the transmission of a signal, and a receiver for receiving complex channel symbols at its input. To achieve a high transmission rate and good resistance to interference, the transmitter is configured to code the complex channel symbols by using orthogonally distributed channel resources into channel symbols such that a channel symbol to be transmitted using at least one antenna pattern during at least one channel resource unit is a linear combination of at least three modulation symbols. The invention also includes a transmitter for transmitting more than T complex modulation symbols during T channel resource units, wherein T is at least 2.

24 Claims, 3 Drawing Sheets

OTHER PUBLICATIONS

Ganesan, G. et al."Space-Time Diversity Using Orthogonal and Amicable Orthogonal Designs", IEEE International Conference on Acoustics, Speech and Signal Processing, 2000, vol. 5, pp. 2561-2564.

Ganesan G. et al. "Space-Time Block Codes: A Maximum SNR Approach", IEEE Transactions on Information Theory, vol. 47, No. 4, May 2001.

Stamoulis, A. et al. "Space-Time Block-Coded OFDMA with Linear Precoding for Multirate Services", IEEE Transactions on Signal Processing, vol. 50, No. 1, pp. 119-129, Jan. 2002.

Damen, M.O. et al. "A Study of Some-Time Codes with Rates Beyond One Symbol per Channel Use", IEEE Global Telecommunications Conference, 2001, vol. 1, pp. 445-449.

Tirkkonen, O. et al. "Improved MIMO Performance with Non-Orthogonal Space-Time Block Codes", IEEE Global Telecommunications Conference, 2001, vol. 2, pp. 1122-1126.

G.J. Foschini: "Layered-Spece-Time Architecture for Wireless Communication in a Fading Environment When Using Multi-Element Antennas", Bell Labs Technical Jouranl, Autumn 1996.

* cited by examiner

TRANSMISSION METHOD USING COMPLEX CHANNEL SYMBOLS

This is a Continuation of International Application No. PCT/FI02/00553 filed Jun. 24, 2002, which designated the U.S. and was published under PCT Article 21(2) in English.

FIELD OF THE INVENTION

The invention relates to a transmission method in a radio system. The invention relates particularly to a transmission method using more than one antenna both in the transmitter and in the receiver and using transmit diversity.

BACKGROUND OF THE INVENTION

In telecommunication, the transmission path used to relay signals is known to cause interference to the telecommunication. This occurs regardless of the physical form of the transmission path, whether it is e.g. a radio link, an optical fibre or a copper cable. Particularly in radio communication, situations often arise wherein the quality of the transmission path varies from one data link to another and during the link, too.

Fading is a typical phenomenon on the radio path, causing changes to the transmission channel. Other simultaneous links may also cause interference, which may vary as a function of time and place.

A solution to the problem is the use of diversity in the transmitter. Temporal diversity uses interleaving and coding, which achieve temporal diversity in the signal to be transmitted. However, the disadvantage here is that delays are created in the transmission, especially when the channel is slowly fading. In frequency diversity, in turn, the signal is transmitted simultaneously at several frequencies. However, this is an ineffective method when the channel has a wide coherence bandwidth.

Antenna diversity uses more than one antenna in signal transmission and/or reception. In this case, the signal components that multipath propagated through different channels are not likely to be disturbed by a simultaneous fading. In receive diversity, two or more antennas having a different location or polarization are used to receive a transmitted signal. A disadvantage in receive diversity is that the use of two antennas is difficult to implement in a small-sized terminal. In transmit diversity, the same signal is transmitted to the receiver using two or more different antennas. Transmit diversity is more easily applicable in downlink in mobile telephone systems than is receive diversity, since it is easier to provide a base station than a terminal with more than one antenna.

Another way to use several antennas is the MIMO method (multiple input, multiple output). MIMO is described in detail in the publication G. J. Foschini, '*Layered Space-Time Architecture for Wireless Communication in a Fading Environment When using Multi-Element Antennas*', Bell Labs Technical Journal, Autumn 1996, which is incorporated herein by reference. MIMO can achieve good performance, but it is subject to the signals transmitted and received via different antennas propagating via different channels. In other words, the channels should not correlate much with each other.

The aim in telecommunication is not only to transmit a signal as faultlessly as possible but also to transfer information as efficiently as possible. Herein, efficiency means that the aim is to utilize the capacity of the transmission channel as efficiently as possible in data transmission. The transmission rates to be achieved in planning cellular radio systems are particularly interesting.

Conventionally, the use of diversity and an increase in transmission rate have been mutually exclusive alternatives.

BRIEF DESCRIPTION OF THE INVENTION

The object of the invention is to provide a method and an apparatus for implementing the method, using transmit diversity to achieve a high transmission rate and good resistance to interference.

This is achieved by a transmission method wherein channel symbols composed of complex modulation symbols are transmitted via two transmit antenna patterns by using orthogonally distributed channel resources. In the method of the invention, a channel symbol to be transmitted using at least one antenna pattern during at least one channel resource unit is a linear combination of at least three modulation symbols, and more than T complex modulation symbols are transmitted during T symbol periods, wherein T is at least 2.

The invention also relates to a transmission method wherein channel symbols composed of complex modulation symbols are transmitted via at least three transmit antenna patterns by using orthogonally distributed channel resources. In the method of the invention, a symbol to be transmitted using at least one antenna pattern during at least one channel resource unit is a linear combination of more than T modulation symbols, wherein T is at least 2, and at least 2T complex modulation symbols are transmitted during T channel resource units via more than two transmit antenna patterns.

The invention also relates to a transmitter comprising antenna means for achieving two transmit antenna patterns for the transmission of a signal, means for receiving complex channel symbols at its input, means for coding the complex channel symbols by using orthogonally distributed channel resources into channel symbols such that a channel symbol to be transmitted using at least one antenna pattern during at least one channel resource unit is a linear combination of at least three modulation symbols, and means for transmitting more than T complex modulation symbols during T channel resource units, wherein T is at least 2.

The invention also relates to a transmitter comprising antenna means for achieving at least three transmit antenna patterns for the transmission of a signal, means for receiving complex channel symbols at its input, means for coding the complex channel symbols by using orthogonally distributed channel resources into channel symbols such that a channel symbol to be transmitted using at least one antenna pattern during at least one channel resource unit is a linear combination of more than T modulation symbols, wherein T is at least 2, and means for transmitting at least 2T complex modulation symbols during T channel resource units via more than two transmit antenna patterns.

The invention utilizes diversity transforms in connection with a MIMO transmission. The use of diversity transforms on overlapping diversity channels with a non-singular correlation matrix achieves equally high transfer rates as previous MIMO methods, but with improved performance in terms of interference.

In an embodiment of the invention, each symbol to be transmitted is sent via more than one antenna as transmit sequences using a given transmit diversity. The transmit sequences are sent simultaneously at most partly orthogonal. Partly overlapping transmit sequences can be added together such that, in reception, the matched filter correlation matrix is full rank, and the determinant of the matched filter output matrix is maximized.

In an embodiment of the invention, complex diversity transform is used to replace at least part of the symbol sequences with super symbol sequences, which tolerate fading and interference on the transmission path.

Transmit diversity is preferably achieved by using space-time block coding.

The invention may be utilized for instance in radio systems between two transceivers, such as a base station and a terminal. The radio system may be a WCDMA system, for example.

BRIEF DESCRIPTION OF THE FIGURES

In the following, the invention will be described in detail in connection with preferred embodiments with reference to the accompanying drawings, in which.

DESCRIPTION OF THE EMBODIMENTS

The structure of the UMTS mobile telephone system, used as an example of a system in which the preferred embodiments of the invention are applicable, will be described by way of example with reference to FIG. 1.

The main parts of a mobile telephone system are a core network CN, a UMTS terrestrial radio access network UTRAN and user equipment UE. The interface between the core network CN and the radio access network UTRAN is called Iu, and the air interface between the UTRAN and the UE is called Uu.

The user equipment UE is composed of two parts: mobile equipment ME comprising a radio terminal used to establish a radio link over the interface Uu. The UMTS subscriber identity module USIM is a smart card comprising data on the identity of the subscriber and typically performs identification algorithms, stores encryption parameters and subscriber data.

The UTRAN is composed of radio network subsystems RNS. An RNS is composed of a radio network controller RNC and one or more nodes B. In practice, node B refers to a base station. The radio network controller RNC manages radio resources by base stations connected thereto.

The core network CN is composed of several parts. A home location register HLR is a database in a subscriber's home system for maintaining a user service profile. The home location register also maintains data on user location with the accuracy of an MSC. A mobile services switching centre/visitor location register MSC/VLR is a switch (MSC) and a database (VLR) servicing the terminal equipment as regards circuit-switched (CS) services. The MSC switches circuit-switched services and the VLR maintains data on the user profile and location. A gateway MSC GMSC is in turn a switch connecting the UMTS to external services or networks. All circuit-switched connections are switched via the GMSC. The functionality of a serving GPRS (General Packet Radio Service) support node SGSN corresponds to the functionality of the MSC/VLR, but it forwards packet-switched (PS) connections. Correspondingly, a gateway GPRS support node GGSN corresponds functionally to the GMSC, but as regards packet-switched connections. External networks can be divided into two types: circuit-switched networks, such as existing telephone networks, and packet-switched networks, such as the Internet.

The UTMS comprises several specified interfaces. A Cu interface is located between the smart card USIM and the mobile equipment ME. The Uu interface is located between the terminal equipment and the base station. The interface between the core network CN and the radio access network UTRAN is called Iu. The interface between the radio network subsystems RNS is called Iur. This enables soft handovers between radio network controllers of different manufacturers. The interface between a radio network controller RNC and a base station B is called Iub.

Figure 1:
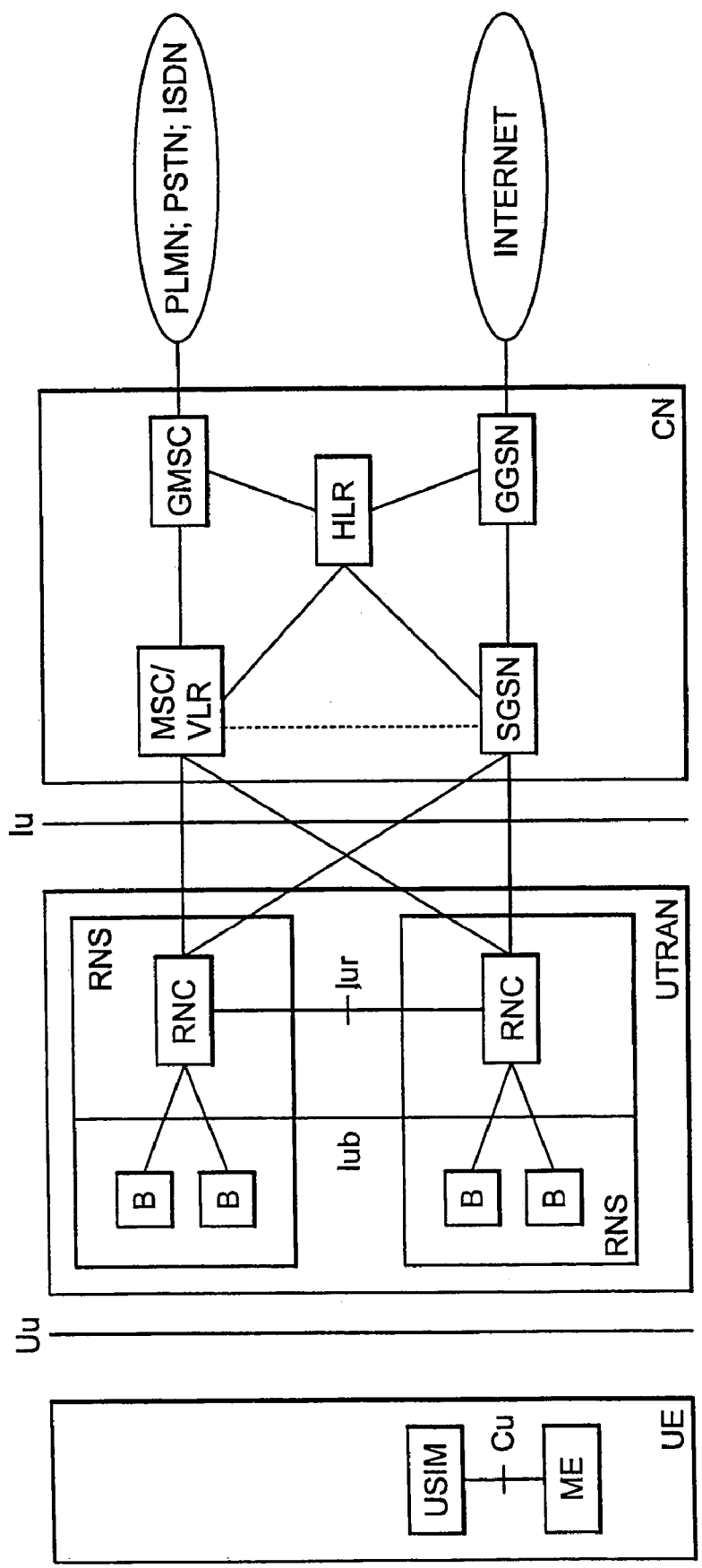
FIG. 1 illustrates the structure of a telecommunications used as an example.
Figure 2:
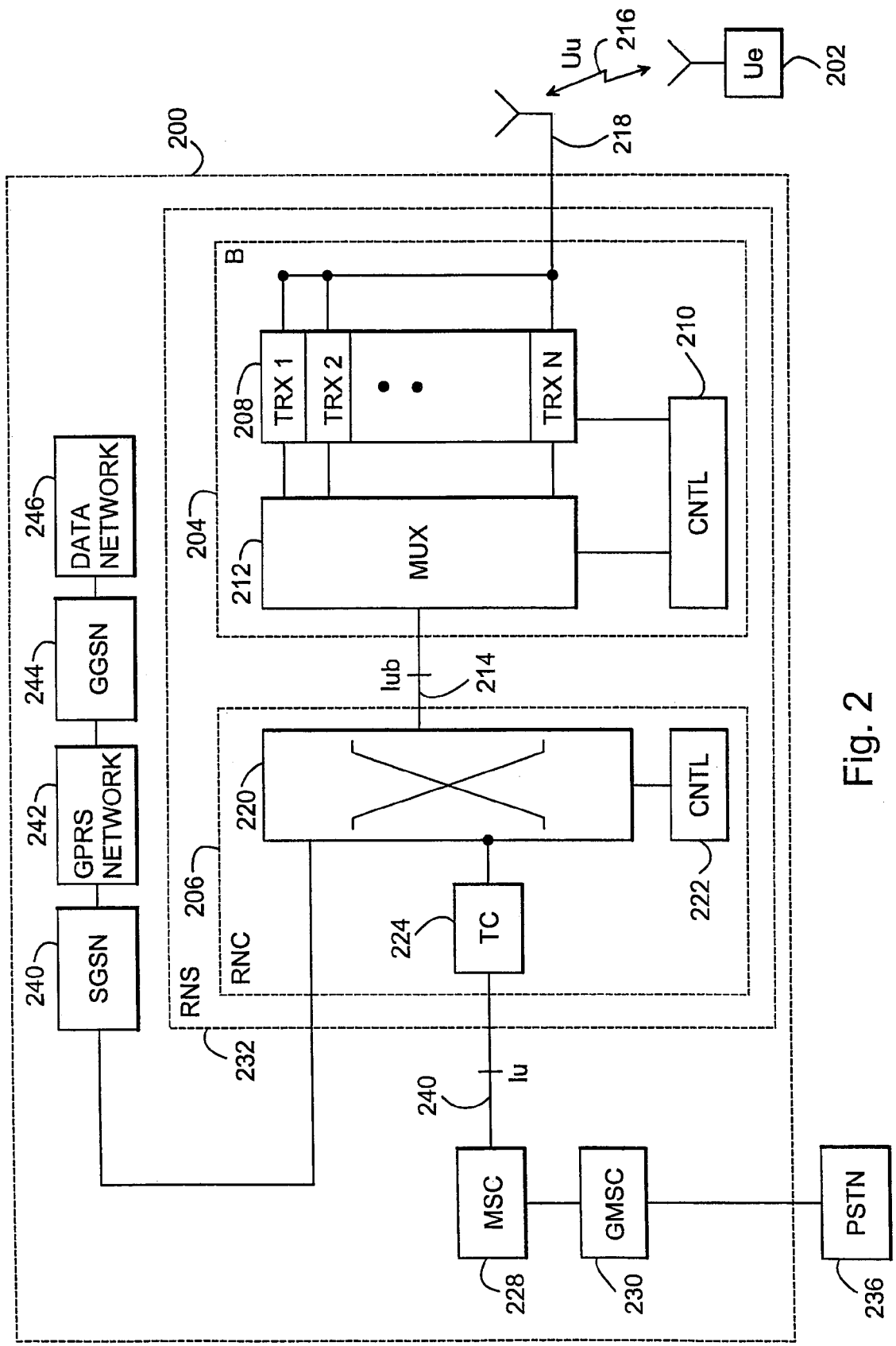
FIG. 2 illustrates more exactly the structure of a telecommunications used as an example.
Figure 3:
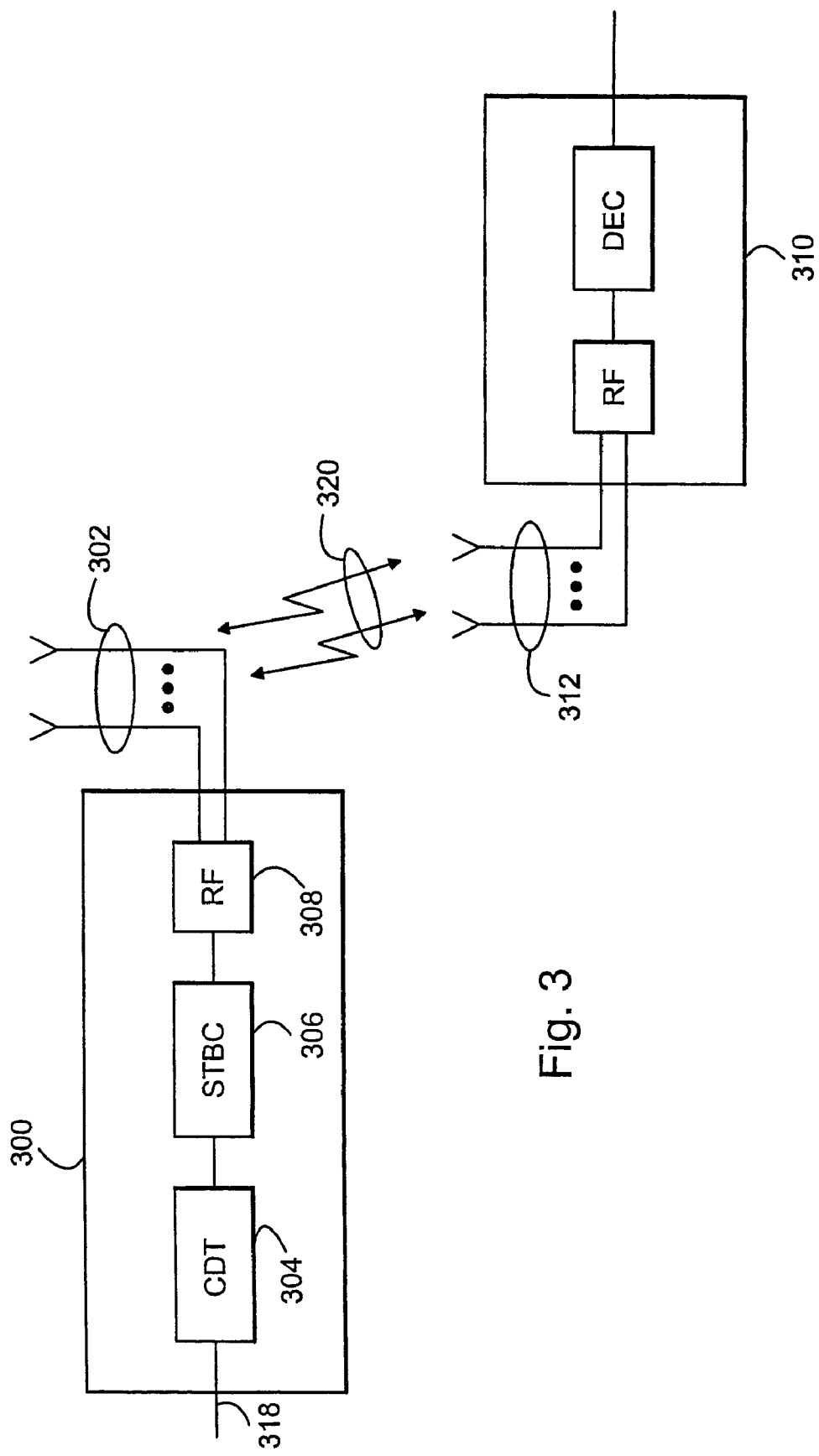
FIG. 3 shows a transmitter of a preferred embodiment of the invention and a receiver suitable for receiving a signal transmitted by the transmitter.

FIG. 1 shows the structure on quite a general level, wherefore it will be illustrated in more detail in FIG. 2 by means of an example of a cellular radio system. FIG. 2 only shows the essential blocks, but it is apparent to a person skilled in the art that a conventional cellular radio network also includes a number of other functions and structures, which do not have to be described in more detail herein. It should also be noted that FIG. 2 shows only an exemplary structure. The details of the systems according to the invention may differ from those shown in FIG. 2, but such differences are not of significance to the invention.

Thus, a cellular radio network typically comprises a fixed network infrastructure, i.e. a network part 200, and terminal equipments 202, which can be fixed, vehicle-mounted or portable terminals. The network part 200 includes base stations 204. A base station corresponds to node B shown in the previous figure. Several base stations 204 are controlled in a centralized manner by a radio network controller 206 communicating with them. A base station 204 comprises transceivers 208 and a multiplexer unit 212.

The base station 204 further comprises a control unit 210, which controls the operation of the transceivers 208 and the multiplexer 212. The multiplexer 212 is used to place the traffic and control channels used by several transceivers 208 to a common transmission link 214. The transmission link 214 forms the Iub interface.

The transceivers 208 of the base station 204 communicate with an antenna unit 218, which implements a bi-directional radio connection 216 to the terminal equipment 202. The structure of the frames to be transmitted over the bi-directional radio connection 216 is specified system-specifically, and it is referred to as an air interface Uu. In the preferred embodiments of the invention, at least a part of a signal is transmitted by means of three or more transmit antennas or three or more beams provided by several transmit antennas.

The radio network controller 206 comprises a group switching field 220 and a control unit 222. The group switching field 220 is used to switch speech and data and to connect signalling circuits. A radio network subsystem 232 formed by the base station 204 and the radio network controller 206 also includes a transcoder 224. The transcoder 224 is usually located as close to the mobile services switching centre 228 as possible, since speech can thus be transmitted in the cellular network format between the transcoder 224 and the radio network controller 206, thus saving transmission capacity.

The transcoder 224 transforms the different digital speech coding formats used between a public switched telephone network and a mobile telephone network to be compatible with one another, e.g. from the fixed network format to some other format of a cellular radio network format, and vice versa. The control unit 222 performs call control, mobility management, gathering of statistical data and signalling.

As is shown in FIG. 2, the group switching field 220 is used to carry out switching both to a public switched telephone network (PSTN) 236 via the mobile services switching centre 228 and a gateway MSC 230 and to a packet transmission network 242.

The connection between the packet transmission network 242 and the group switching field 220 is established by a SGSN (Serving GPRS Support Node) 240. The function of the support node 240 is to transfer packets between the base station system and a GGSN (Gateway GPRS Support Node) 244, and to keep record of the terminal equipment's 202 location within its area.

The gateway node 244 connects a public packet transmission network 246 with the packet transmission network 242. An Internet protocol or an X.25 protocol can be used at the interface. The gateway node 244 encapsulates the inner structure of the packet transmission network 242 to conceal it from the public packet transmission network 246, and therefore the public packet transmission network 246 sees the packet transmission network 242 as a subnetwork, and the public packet transmission network can address packets to and receive them from the terminal equipment 202 located in the network.

The packet transmission network 242 is typically a private network employing an Internet protocol and carrying signalling and tunnelled user data. Below the Internet protocol layer, both the architecture and protocols of the network structure 242 may vary according to operator. The public packet transmission network 246 may be for example the global Internet.

Let us study a preferred embodiment of the invention, which uses two transmit antennas, two reception antennas and a double symbol rate compared with a situation wherein only one antenna would be used.

In an embodiment of the invention, the transmission rate is increased by transmitting more symbols in symbol periods than in a transmission with one antenna. Simultaneously, transmit diversity is added to the transmission by transmitting each symbol via several antennas. For this reason, the transmission has to be designed over several symbol periods, frequency bands, spreading codes or frequency band Fourier modes (e.g. orthogonal frequency division multiplexing (OFDM) overtones), for example. Thus, the transmission uses orthogonally distributed channel resources. In the following, preferred embodiments will be described by way of example by using transmission over several symbol periods.

The symbols to be transferred are generated from bits or symbols produced by a potential channel coder and/or interleaver. The channel code may be, for example, a convolution code, a block code, a turbo code, a low-density parity check code, a trellis code etc. If the output of the channel coder and/or interleaver is bit-form, symbols are generated from these in a modulator in known manners, e.g. QPSK, M-PSK (M>1), M-QAM (M>2), higher-dimensional spherical modulations, frequency modulations, grid modulations (two or higher dimensional) or a combination of these. The modulator unit can be combined with the transmission method described herein, resulting in a space-time modulator.

Each symbol to be transmitted is thus transmitted as transmit sequences via more than one antenna using a determined transmit diversity. The transmit diversity is preferably implemented using space-time block coding (STBC). In this case, the order of the transmit diversity is at least two. Let us assume that the symbols to be transmitted are grouped into blocks s1 and s2 comprising two symbols. In the basic form, ST coding is defined by a 2×2 matrix:

$$(s1, s2) \Rightarrow \begin{bmatrix} s1 & s2 \\ -s2^* & s1^* \end{bmatrix},$$

wherein * denotes a complex conjugate. This matrix extends the coding over two symbol periods.

The transmit diversity MIMO transmission of the invention is achieved as follows: The transmit sequences are transmitted simultaneously at most partly orthogonally, so that the transmission rate increases. In coding, overlap is achieved for the different transmit sequences. Overlapping transmit sequences can be added together such that in the receiver the matched filter correlation matrix is full rank and the determinant of the matched filter output matrix is maximized. To obtain overlap, two sequences are added together. The mutual interference between the sequences to be added together (and at the same time, the capacity of the transmission path) can be affected by adding a phase shift to the addition, yielding the following code matrix:

$$C(s1, s2, s3, s4) = \begin{bmatrix} s1 & s2 \\ -s2^* & s1^* \end{bmatrix} + \begin{bmatrix} 1 & 0 \\ 0 & e^{i\omega} \end{bmatrix} \begin{bmatrix} s3 & s4 \\ -s4^* & s3^* \end{bmatrix}. \quad (1)$$

The phase shift can be interpreted as a choice of a basis for the transmission of symbols s3, s4 in the 2×2 matrix space of ST coding, which basis does not overlap with the basis used for coding symbols s1, s2.

Each row of this code matrix is transmitted from a given transmit antenna (or transmit antenna pattern) during two different symbol periods, and each column is transmitted as a given symbol period from two different transmit antennas (or transmit antenna patterns). These two symbol periods can be successive. In a preferred embodiment, the time between two symbol periods is shorter than the correlation time of the channel. Two transmit antenna patterns can be generated by using known methods for two or more transmit antennas. These include for instance feedback information (fast or slow) transmitted by a receiver to a transmitter and usable in selecting the strongest beams and/or select the transmit beams (the phase shifts between transmit antenna routes) such that the transmit channels interfere strengthening each other; other beam formation based for instance on measurements made by a base station; randomizing the sum channel of more than one transmit antenna by using random phase shifts in the sum channel; orthogonal transmit diversity; antenna hopping; delay diversity.

When the signal is transmitted using the above code matrix, the form of the symbols received by the receiver is:

$$r = \begin{bmatrix} r_{11} & r_{12} \\ r_{21} & r_{22} \end{bmatrix} = C \begin{bmatrix} \alpha_{11} & \alpha_{12} \\ \alpha_{21} & \alpha_{22} \end{bmatrix} + \text{noise}.$$

The received symbols r are now a 2×2 matrix, with two columns corresponding to the two receive antennas and two rows corresponding to the two symbol periods the code covers. The channel matrix is also a 2×2 matrix, with two columns corresponding to transmit antenna routes from two transmit antenna patterns to two receive antenna patterns. The receive antenna patterns are either simply two receive antennas or they are generated from two or more receive antennas using known methods (e.g. beam formation; interference rejection combining). Herein, the channel matrix is presented as a single-path channel for the sake of simplicity. A multipath channel and the intersymbol interference possibly caused thereby can be processed with known methods, such as a RAKE receiver, prefilter and equalizer.

In the above transmission method, symbol sequence s1, s2 is coded orthogonally, as is s3, s4. There exists unorthogonality between these sequences causing interference between the sequences. In a preferred embodiment, the phase shift of the transmission method is selected so as to minimize the interference between the orthogonally coded symbol sequences s1, s2 and s3, s4. In addition, the symbol sequences are selected so as to be able to detect the symbols as faultlessly as possible in spite of the inference.

Let us study the selection of the phase shift. As is common with ST block coding, the matched filter outputs can be specified by means of complex conjugate transposes of equivalent channel matrices and received symbol vectors. When several receive antennas are used, the total value for the matched filter output is obtained as the sum of the matched filter outputs of individual antennas. In this connection, since there are two receive antennas, there are two equivalent channel matrices:

$$H_1 = \begin{bmatrix} \alpha_{11} & \alpha_{12} \\ \alpha_{12}^* & -\alpha_{11}^* \end{bmatrix}; H_2 = \begin{bmatrix} \alpha_{21} & \alpha_{22} \\ \alpha_{22}^* & -\alpha_{21}^* \end{bmatrix}.$$

The matched filter outputs for symbols s1 and s2 are $$\begin{bmatrix} y_1 \\ y_2 \end{bmatrix} = H_1^H \begin{bmatrix} r_{11} \\ r_{21}^* \end{bmatrix} + H_2^H \begin{bmatrix} r_{12} \\ r_{22}^* \end{bmatrix} \quad (2)$$

$$= (p_1 + p_2) \begin{bmatrix} s1 \\ s2 \end{bmatrix} + \begin{bmatrix} p_1 + p_2 e^{-i\omega} & c(1-e^{-i\omega}) \\ c^*(1-e^{-i\omega}) & p_2 + p_1 e^{-i\omega} \end{bmatrix} \begin{bmatrix} s3 \\ s4 \end{bmatrix}.$$

Herein, $p_1 = |\alpha_{11}|^2 + |\alpha_{21}|^2$ is the sum of the channel powers from the first transmit antenna to both receive antennas. Correspondingly, $p_2 = |\alpha_{12}|^2 + |\alpha_{22}|^2$ is the sum of the channels leaving the second transmit antenna. The correlation between the antennas is given by $c = \alpha_{11}^* \alpha_{12} + \alpha_{12}^* \alpha_{22}$.

When computing the matched filter output for symbols s3, s4, the phase shift has to be taken into account:

$$\begin{bmatrix} y_3 \\ y_4 \end{bmatrix} = H_1^H \begin{bmatrix} r_{11} \\ e^{i\omega} r_{21}^* \end{bmatrix} + H_1^H \begin{bmatrix} r_{12} \\ e^{i\omega} r_{22}^* \end{bmatrix} \quad (3)$$

$$= (p_1 + p_2) \begin{bmatrix} s3 \\ s4 \end{bmatrix} + \begin{bmatrix} p_1 + p_2 e^{-i\omega} & c(1-e^{-i\omega}) \\ c^*(1-e^{-i\omega}) & p_2 + p_1 e^{-i\omega} \end{bmatrix} \begin{bmatrix} s1 \\ s2 \end{bmatrix}.$$

The combination of the above formulas (2) and (3) yields the total matched filter output:

$$\vec{y} = M^{SMFC} \vec{s} + \text{noise},$$

wherein the symbol-specific matched filter correlation matrix is:

$$M^{SMFC} = \begin{bmatrix} p_1 + p_2 & 0 & p_1 + p_2 e^{-i\omega} & c(1-e^{-i\omega}) \\ 0 & p_1 + p_2 & c^*(1-e^{-i\omega}) & p_2 + p_1 e^{-i\omega} \\ p_1 + p_2 e^{-i\omega} & c(1-e^{-i\omega}) & p_1 + p_2 & 0 \\ c^*(1-e^{-i\omega}) & p_2 + p_1 e^{-i\omega} & 0 & p_1 + p_2 \end{bmatrix}. \quad (4)$$

The above-mentioned double diversity is visible in the above matrix in that the total power of the four channels $p_1 + p_2$ is on the diagonal of the matrix. In this matrix, the interference between the symbol sequences s1, s2 and s3, s4 is visible in elements off the diagonal.

The determinant of the above matrix is $$\det[M^{SMFC}] = 16 \sin[\omega/2]^4 |\alpha_{12}\alpha_{21} - \alpha_{11}\alpha_{22}|^4. \quad (5)$$

The determinant measures the relative power of the interference between the symbol sequences s1, s2 and s3, s4. In order to separate the symbol sequences s1, s2 and s3, s4 from each other, the matched filter correlation matrix has to be full rank. This means that the above determinant has to be non-zero, i.e. the phase shift has to be $$\omega \neq 0.$$

In addition, in order for the mutual interference between the symbol sequences to be as low as possible, the phase shift has to be selected so that the determinant is maximized. Thus, $$\omega = \pi = 180°.$$

This choice of transmission method maximizes the transmission rate and the related capacity. To utilize the transmit diversity added to the method, the symbol sequences have to be selected in a certain manner.

Let us study a method by which the symbol sequences can be selected such that they can be detected as faultlessly as possible. In solutions according to the preferred embodiments of the invention, the symbol sequences are replaced by complex diversity transform with super symbol sequences that endure fading and interference on the transmission path and decrease the effect of the mutual interference between the symbol sequences s1, s2 and s3, s4 on the detection of these symbol sequences.

The complex symbols are selected from a modulation alphabet A including a finite number of points. Detection error probability is measured by what is called a distance matrix, which is the Hermitean square of the difference matrix of the transmitted code matrix C(s1, s2, s3, s4) and a detected code matrix Ci(s1i, s2i, s3i, s4i) possibly including erroneous symbols:

$$E = (C - Ci)^H (C - Ci).$$

If the difference between the transmitted symbols and the (possibly erroneous) detected symbols is denoted by $$e1 = s1 - s1i;\ e2 = s2 - s2i;\ e3 = s3 - s3i;\ e4 = s4 - s4i,$$

the distance matrix is of the form $$E = \begin{bmatrix} a+b & d^* \\ d & a-b \end{bmatrix},$$

wherein $a = |e1|^2 + |e2|^2 + |e3|^2 + |e4|^2$ is the summed up Euclidian distance of all possible symbol errors, and the change in the Euclidian distance due to intersymbol interference is caused by the terms $$b = 2\text{Re}(e1^* e3 - e2^* e4);\ d = 2(e1^* e4 + e2^* e3).$$

The space-time code error correction properties are largely specified by the properties of the distance matrix. In order for the transmit diversity to be useful, the degree of the distance matrix should be at least two, at all possible errors e occurring in the detection. Furthermore, the determinant of the distance matrix can be maximized.

Let us study the degree of the distance matrix in some special cases. If the assumption is that no error occurs in the detection of symbols s2 and s4, the interference term d=0, and the determinant of the distance matrix is $$\text{Det}(E)=|e1^2-e3^2|^2$$

In order for the distance matrix to be of degree two, the determinant has to be nonzero. This means that, except for the sign, exactly the same error must not occur in the detection of symbols s1 and s3. On the other hand, if the assumption is that no error occurs in the detection of symbols s2 and s3, the interference term b=0, and the determinant of the distance matrix is $$\text{Det}(E)=(|e1|^2-|e4|^2)^2$$

In order for the distance matrix to be of degree two, no such error must occur in the detection of symbols s2 and s4 that the absolute values of the errors are exactly the same. The same kinds of results are obtained in the study of combinations where s1 and s3 or s2 and s3 are errorless. To avoid pathological cases, wherein the degree of the distance matrix is not two, the following requirements have to be met:

the same error, except for the sign, must not occur in the detection of symbols s1 and s3 the same error, except for the sign, must occur in the detection of symbols s2 and s4 no error having the same absolute value must occur in the detection of symbols s1 and s4 no error having the same absolute value must occur in the detection of symbols s2 and s3.

There are many ways to select a symbol alphabet A having these properties. For example, the symbol sequences s1, s2 and s3, s4 can be sent at different powers. In this case, the above pathological cases never occur in their detection. The symbol sequences s1, s2 and s3, s4 can also be selected from disjoint subgroups A12 and A34 of alphabet A such that the subgroups A12 and A34 do not include points that have the same absolute value. A preferable way to implement this is to use complex diversity transform.

Let us study complex diversity transform in a case when a number of bits, dividable by two, is transmitted in a symbol period, symbols s1, s2, s3, s4 each containing the same number of bits. If for instance four bits are transmitted in a symbol period, s1, s2 are taken from what is known as the QPSK alphabet, thus they are one of the numbers $\{1+i,1-i,-1+i,-1-i\}/\sqrt{2}$. The symbol sequence s3, s4 is formed as a complex diversity transform from a second symbol sequence ŝ3,ŝ4, which is taken from the same alphabet as is s1, s2, from the QPSK alphabet in the exemplary case. The complex diversity transform is preferably implemented by s3, s4 being a unitary (complex valued orthogonal) linear combination of QPSK symbols ŝ3,ŝ4:

$$\begin{bmatrix} s3 \\ s4 \end{bmatrix} = \begin{bmatrix} \mu & v \\ -v^* & \mu^* \end{bmatrix} \begin{bmatrix} \hat{s}3 \\ \hat{s}4 \end{bmatrix}$$

Herein, the sum of the squares of the absolute values of the complex numbers μ, v is one: $|\mu|^2+|v|^2=1$. In order to avoid the above cases that are pathological to the detection, the diversity transform has to be selected such that the element off the diagonal v≠0. Similarly, μ≠0 must be true. This prevents both errors having the same absolute values and errors that are the same except for the sign. By this choice, the elements of the symbol sequence s3, s4 are linear combinations of two symbols, and the channel symbols to be transmitted are thus linear combinations of three symbols; for example, during the first symbol period, the channel symbol $$s1+s3 = s1+\mu\,\hat{s}3+v\,\hat{s}4$$

is transmitted from the first antenna.

An optimal diversity transform can be selected so as to minimize the probability of erroneous reception. In an optimal diversity transform, not only conditions v≠0 and μ≠0 but also μ and/or v are selected so that their phases are nonzero. This directly minimizes the distance to pathological cases wherein the errors are the same except for the sign. If s1,s2, ŝ3,ŝ4 are in the QPSK alphabet, an optimal diversity transform is obtained by selecting $$\mu = e^{i\pi 29/80}\cos(9\pi/50) \approx 0.353+0.767i$$

$$v = e^{-i\pi 19/80}\sin(9\pi/50) \approx 0.393-0.364i.$$

The above is a description of an optimal and implementation-optimal diversity transform when four bits are transmitted in a symbol interval. If more bits are transmitted, i.e. a higher modulation is used, then the optimal diversity transform is somewhat different. The essential features, i.e. non-diagonality and non-trivial phases do not depend on the modulation. The implementation-optimal diversity $\upsilon = \sqrt{3/(16-6*\sqrt{2})}(1+1\sqrt{3})\approx$transform is the same as the above-mentioned if quadrature-amplitude modulation is used, such as 16-QAM, 64-QAM, 256-QAM.

If the 8-PSK alphabet is used, the optimal diversity transform can be expressed as follows:

$$\mu = \sqrt{3/(16-6*\sqrt{2})}\left(1+\sqrt{3-2*\sqrt{2}}\,i\right) \approx 0.632(1+0.414i)$$
$$= 0.632 + 0.262i$$

$$v = \sqrt{3/(16-6*\sqrt{2})}\left(1+1/\sqrt{3}\right) \approx 0.632(1+0.577i)$$
$$= 0.632 + 0.365i$$

A sub-optimal transform is of the form $$\mu = v = \frac{e^{i\pi/8}}{\sqrt{2}} \approx 0.653 + 0.271i.$$

Next, let us study generally the matched filtering to be performed in a receiver in an embodiment of the invention using an arbitrary number of transmit and receive antennas/antenna patterns. Let us study real valued matched filtering. Generally, signal coding in a transmitter is specified by a code matrix C, which linearly codes a vector $\vec{b}$ that is composed of 2K real symbols (comprising the real and imaginary parts of K complex symbols). The code matrix C is a T×N matrix, wherein T is the number of symbol periods covered by the code matrix (or the number of frequency bands or spreading codes or orthogonal OFDM overtones), and N is the number of transmit antenna patterns. The channel matrix α representing the channel is a N×M matrix, and a received signal R is expressed as a T×M matrix, wherein M is the number of receive antenna patterns:

$$R = C\alpha + \text{noise}.$$

Since C is linear for real symbols b, the received signal can be processed as a (TM)×1-vector $\vec{R}$, which can be expressed in the form:

$$\vec{R} = H\vec{b} + \text{noise},$$

wherein the equivalent channel matrix H is a TM×2K matrix, which is dependent on the structure of the code and on the channel.

Matched filtering can now be performed using the complex conjugate transpose $H^H$ of the estimated channel matrix H:

$$\vec{y} = H^H\vec{R} = M^{MF}\vec{b} + \text{noise},$$

wherein the 2K×2K matrix $M^{MF}$ is a correlation matrix after the matched filter.

Different decoding methods have been developed for inverting the correlation matrix. These methods include for instance decorrelation and LMMSE (Linear minimum mean square error) detection and iterative (absolute) interference cancellation.

To determine performance, the properties of the matrix are studied. It can be shown that the capacity of a connection comprising N transmit and M receive antennas with the coding extending over T symbol periods can generally be obtained from the formula $$K = \frac{1}{2T}E\left\{\log det\left(I_{2K} + \frac{P}{N\sigma^2}H*H\right)\right\}$$

$$= \frac{1}{2T}E\left\{\log det\left(I_{2K} + \frac{P}{N\sigma^2}M^{MF}\right)\right\}.$$

Now, when we study more closely the presented determinant formula (5), we may state that in the case of two transmit and receive antennas the capacity is maximized when the interference between the symbol sequences is minimized, i.e. if we take $\omega = \omega_{OPT} = \pi$. In this case the capacity is exactly the same as if independent symbols were transmitted from each antenna at each point in time, such as in reference [J. Foschini, above]. The transmit method of the invention thus achieves the same capacity (and thus the same transmit rate) as an independent transmission, but due to the transmit diversity added to the transmission the number of errors in detection is smaller. In the light of the above equations, designing similar transmission methods for more than two transmit and/or receive antennas is straightforward.

Let us further study an example of applying the solution presented when more than two antennas are used. Let us write the basic matrix of ST coding as follows:

$$A(s1, s2) = \begin{bmatrix} s1 & s2 \\ -s2^* & s1^* \end{bmatrix}. \quad (6)$$

When two antennas are used at the optimal phase shift w=p=180°, the code matrix C2 takes the form $$C2 = A(s1, s2) + \begin{bmatrix} 1 & 0 \\ 0 & e^{i\omega} \end{bmatrix} A(s3, s4). \quad (7)$$

A code matrix derived from this can now be applied to four antennas:

$$C4 = A[C2(s1, s2, s3, s4), C2(s5, s6, s7, s8)] +$$

$$\begin{bmatrix} 1 & 0 \\ 0 & -1 \end{bmatrix} A[C2(s9, s10, s11, s12), C2(s13, s14, s15, s16)].$$

This is a 4×4 matrix with 16 symbols, i.e. coding ratio is 16/4=4. C4 is thus obtained by taking two pairs of C2 codes, each including different symbols, and embedding one pair in formula 6 in place of the symbols and the other in place of the symbols in the matrix of formula (6) multiplied with matrix $$\begin{bmatrix} 1 & 0 \\ 0 & -1 \end{bmatrix}.$$

Alternatively, one pair can be embedded in place of the symbols in the matrix of formula (6), the result being multiplied by an imaginary unit. The obtained 4×4 matrices are added together. Alternatively, the method can be applied for instance to 8 antennas, yielding an 8×8 matrix. Take two pairs of C4 codes with different symbols, embed them in formula 6 in place of the symbols, add the obtained matrices together and multiply one by an imaginary unit. This yields an eight transmit antenna code that reaches channel capacity. This iterative procedure can be continued also for several transmit antennas.

Let us study a transmitter 300 according to an embodiment of the invention and a receiver 310 suitable for receiving a signal transmitted by the transmitter. The transmitter comprises several antennas 302, which number two or more than two in the preferred embodiments of the invention. The antennas can be implemented as individual antennas or as antenna element arrays or antenna arrays, as is apparent to a person skilled in the art. Several separate transmit patterns 320 are achieved with the antennas. Complex modulation symbols 318 arrive as an input at the transmitter. The modulation symbols are first applied to transform means 304, in which the symbols are subjected to complex diversity transform, wherein the symbol sequences are replaced, using complex diversity transform, with super symbol sequences that endure fading and interference on the transmission path and that decrease the effect of inter-symbol sequence interference on the detection of the symbol sequences.

The symbols are then applied to a space-time block coder 306, wherein space-time block coding is performed. This achieves transmit diversity. The channel symbols thus obtained are applied to prior art radio frequency parts 308, wherein they are transferred to radio frequency and transmitted via the antennas 302 so as to achieve several transmit antenna patterns. The coding blocks 304, 306 can be preferably implemented with one or more processors and suitable software or separate components or ASIC circuits.

The transmitter is configured to transmit the symbols using orthogonally distributed channel resources. This may involve for example transmission using several symbol periods, frequency bands, spreading code or frequency band Fourier mode (e.g. orthogonal frequency-division multiplexing (OFDM) overtones).

The receiver 310 comprises several antennas 312, the preferred embodiments of the invention comprising two or more than two. As in the case of the transmitter, the antennas can be implemented as individual antennas or as antenna element arrays or antenna arrays, as is apparent to a person skilled in the the art. A signal received by the antennas 312 is applied to prior art radio frequency parts 314, wherein it is transformed to the intermediate frequency or baseband. From the radio frequency parts, the signal is applied to a decoding block 316, which can be preferably implemented as a decoder implementing a matched filter or other corresponding decoding algorithm. The decoder 316 can be preferably implemented with one or more processors and suitable software or separate components or ASIC circuits.

Although the invention is described above with reference to the example according to the accompanying drawings, it is apparent that the invention is not limited thereto, but can be modified in a variety of ways within the scope of the inventive idea disclosed in the attached claims.

The invention claimed is:

1. A method, comprising:
providing a channel symbol to be transmitted using at least one antenna pattern during at least one channel resource unit is a linear combination of at least three modulation symbols, where more than T complex modulation symbols are transmitted during T symbol periods, wherein T is at least 2; and
transmitting channel symbols composed of complex modulation symbols via two transmit antenna patterns by using orthogonally distributed channel resources.

2. A method as claimed in claim 1, wherein the complex modulation symbols are coded using space-time block coding.

3. A method as claimed in claim 1, wherein the orthogonally distributed channel resources are symbol periods.

4. A method as claimed in claim 1, wherein the orthogonally distributed channel resources are frequency bands.

5. A method as claimed in claim 1, wherein the orthogonally distributed channel resources are spreading codes.

6. A method as claimed in claim 1, wherein the orthogonally distributed channel resources are different frequency band Fourier modes.

7. A method as claimed in claim 1, wherein more than two complex modulation symbols are transmitted during two channel resource units and that each channel symbol to be transmitted is a linear combination of four modulation symbols.

8. A method as claimed in claim 1, wherein at least two modulation symbols are coded orthogonally.

9. A method as claimed in claim 8, wherein the channel symbols are generated by summing up at least two orthogonally coded modulation symbol sequences with a partial phase difference.

10. A method as claimed in claim 9, wherein the phase difference is 180°.

11. A method as claimed in claim 9, wherein the phase difference is used in half of the channel resource units covered by the code.

12. A method as claimed in claim 3, wherein a correlation time is estimated for the transmission channel used in the data transfer, and the time between two symbol periods is selected such that it is shorter than the correlation time estimated for the transmission channel.

13. A method as claimed in claim 9, wherein the orthogonally coded modulation symbols are subjected to diversity transform.

14. A method, comprising:
transmitting channel symbols composed of complex modulation symbols via at least three transmit antenna patterns by using orthogonally distributed channel resources; and
providing a symbol to be transmitted using at least one antenna pattern during at least one channel resource unit is a linear combination of more than T modulation symbols, wherein T is at least 2, where at least 2T complex modulation symbols are transmitted during T channel resource units via more than two transmit antenna patterns.

15. An apparatus, comprising:
a transmitter configured to achieve two transmit antenna patterns for the transmission of a signal;
receiver configured to receive complex channel symbols at its input,
wherein the transmitter is configured to code the complex channel symbols by using orthogonally distributed channel resources into channel symbols such that a channel symbol to be transmitted using at least one antenna pattern during at least one channel resource unit is a linear combination of at least three modulation symbols, and
wherein the transmitter is configured to transmit more than T complex modulation symbols during T channel resource units, wherein T is at least 2.

16. An apparatus as claimed in claim 15, wherein the transmitter configured to subject the symbols to be transmitted to space-time block coding.

17. An apparatus as claimed in claim 15, wherein the transmitter is configured to code the complex modulation symbols to channel symbols by symbol periods such that each channel symbol to be transmitted is a linear combination of four modulation symbols, and transmitter configured to transmit more than two complex modulation symbols during two channel resource units.

18. An apparatus as claimed in claim 15, wherein the transmitter is configured to code the complex modulation symbols by using different frequency bands.

19. An apparatus as claimed in claim 15, wherein the transmitter is configured to code the complex modulation symbols by using symbol periods.

20. An apparatus as claimed in claim 15, wherein the transmitter is configured to code the complex modulation symbols by using different spreading codes.

21. An apparatus as claimed in claim 15, wherein the transmitter is configured to code the complex modulation symbols by using different frequency band Fourier modes.

22. An apparatus, comprising:
an transmitter configured to achieve at least three transmit antenna patterns for the transmission of a signal;
a receiver configured to receive complex channel symbols at its input; and
wherein the transmitter is configured to code the complex channel symbols by using orthogonally distributed channel resources into channel symbols such that a channel symbol to be transmitted using at least one antenna pattern during at least one channel resource unit is a linear combination of more than T modulation symbols, wherein T is at least 2; and
wherein the transmitter is configured to transmit at least 2T complex modulation symbols during T channel resource units via more than two transmit antenna patterns.

23. An apparatus, comprising:
achieving means for achieving two transmit antenna patterns for the transmission of a signal;
receiving means for receiving complex channel symbols at its input;
coding means for coding the complex channel symbols by using orthogonally distributed channel resources into channel symbols such that a channel symbol to be transmitted using at least one antenna pattern during at least one channel resource unit is a linear combination of at least three modulation symbols; and transmitting means for transmitting more than T complex modulation symbols during T channel resource units, wherein T is at least 2.

24. An apparatus, comprising:

achieving means for achieving at least three transmit antenna patterns for the transmission of a signal;

receiving means for receiving complex channel symbols at its input;

coding means for coding the complex channel symbols by using orthogonally distributed channel resources into channel symbols such that a channel symbol to be transmitted using at least one antenna pattern during at least one channel resource unit is a linear combination of more than T modulation symbols, wherein T is at least 2; and transmitting means for transmitting at least 2T complex modulation symbols during T channel resource units via more than two transmit antenna patterns.

* * * * *

UNITED STATES PATENT AND TRADEMARK OFFICE
CERTIFICATE OF CORRECTION

| | | |
|---|---|---|
| PATENT NO. | : 7,460,609 B2 | Page 1 of 1 |
| APPLICATION NO. | : 10/739017 | |
| DATED | : December 2, 2008 | |
| INVENTOR(S) | : Tirkkonen et al. | |

It is certified that error appears in the above-identified patent and that said Letters Patent is hereby corrected as shown below:

In Claim 1, at Col. 13, line 19, please delete "is" and insert --as--.
In Claim 14, at Col. 14, line 3, please delete "is" and insert --as--.
In Claim 22, at Col. 14, line 46, please delete "an" and insert --a--.

Signed and Sealed this
Twenty-fifth Day of January, 2011

David J. Kappos
*Director of the United States Patent and Trademark Office*